United States Patent [19]

Caywood

[11] 3,806,729

[45] Apr. 23, 1974

[54] CHARGE COUPLED DEVICE IR IMAGER

[75] Inventor: John Millard Caywood, Dallas, Tex.

[73] Assignee: Texas Instruments Incorporated, Dallas, Tex.

[22] Filed: Apr. 30, 1973

[21] Appl. No.: 355,612

[52] U.S. Cl. .............. 250/339, 250/211 J, 250/342, 250/370, 307/221 C, 307/311, 317/235

[51] Int. Cl. .............................................. G01t 1/24

[58] Field of Search ......... 250/370, 211 J, 339, 342; 307/221 C; 317/235

[56] References Cited

UNITED STATES PATENTS

| | | | |
|---|---|---|---|
| 3,484,663 | 12/1969 | Halus | 250/370 |
| 3,699,339 | 10/1972 | Taczak | 250/370 |
| 3,746,883 | 7/1973 | Kovac | 307/221 C |

OTHER PUBLICATIONS

"Self-Scanned Image Sensors . . ." by Weimer et al., IEEE Trans. on Electron Devices, Nov. 1971, Vol. 18, No. 11, pp. 996–1003

Solid State Imaging Emerges from Charge Transport, RCA Reprint from Electronics, Feb. 28, 1972, written by Kovac et al.

*Primary Examiner*—Archie R. Borchelt
*Assistant Examiner*—Harold A. Dixon

[57] ABSTRACT

An infrared imager system is disclosed which is characterized by an output having low background radiation noise components. The imager includes an array of charge-coupled device bits which collects charge alternately from the scene and from a uniform background reference source. The signal charge and the reference charge are coupled to a differential detector. Since both the signal and reference charge are collected in the same detector element and are processed identically, material homogeneity requirements are greatly reduced.

7 Claims, 4 Drawing Figures

CHARGE COUPLED DEVICE IR IMAGER

The present invention pertains to infrared imager systems in general, and more particularly to a IR imager system which includes a charge-coupled device array for alternately detecting information from a scene and from a source of IR background radiatin, and coupling the scene related signal and the background signal to a differential detector.

Image systems for visual radiation have progressed at a rapid rate in recent years and compact, reliable image systems of a variety of configurations are available in the art. With respect to IR radiation detection systems, however, a number of problems are encountered which have to date required rather expensive, bulky IR detection systems. By way of illustration, one conventional IR detector system has an array of IR detectors, each detector having an amplifier for amplifying its output. The amplified output is connected to a multiplexer scan converter, which includes an array of light emitting diodes (LED) corresponding to the detector array. Scanning optics are used for scanning the target and also the LED array. A photosensitive pick-up tube is focused on the LED array and provides signals to visual display, such as a CRT. It can be seen that such a system requires a large number of amplifiers (one per channel) and scanning optics. Provision of an IR detector system wherein these requirements could be eliminated would provide a much simpler, less expensive, and more reliable IR system.

One promising technique for providing an improved IR system includes utilizing a semiconductor charge transfer device (CTD) array such as a charge-coupled device (CCD) array or a bucket brigade (BB) array. Such CTD arrays have been used for visual imagers (i.e., radiation on the order of 5,000 A). One perplexing problem in a CCD IR imager is the fact that thermal background radiation at room temperature is many orders of magnitude greater in the IR than in the visible (41 orders of magnitude greater at 10 $\mu$ m than at 5,000 A). This thermal background imposes severe restrictions when it is recognized that in order to achieve 0.1° K resolution a typical IR imager would receive $10^3$ "background" photons from the room temperature background for every "signal" photon it receives. As a result, the homogeneity of materials is extremely demanding, a 0.1 percent variation in collection efficiency from on imager location to another producing a noise charge equal to the signal charge. A second limitation is the requirement for very large storage capacitance. The integration time has a lower limit set by the maximum clock rate, and the amount of charge generated by the background in this integration time is large. Thirdly, the CCD itself must have an extremely large dynamic range such that when the background charge is subtracted from the total, the remaining charge is a true representation of the signal.

Accordingly, an object of the invention is the provision of a CCD IR imager wherein the array of CCD bits alternately is exposed to a scene and to a source of background radiation, and the scene related data and background related data are coupled to a differential detector, thereby eliminating background radiation from the differential detector output.

The various objects of the present invention are provided by an infrared imager system that includes an array of CCD bits formed on the surface of an IR sensitive semiconductor substrate. Alternate rows of the CCD bits are optically active, i.e., store a signal responsive to IR radiation, while the remaining interlaced rows are optically inactive. In a preferred embodiment these optically inactive rows of the array are covered with strips of IR opaque material.

Scanning means are effective to alternately expose the array of CCD bits first to a scene and then to a source of background radiation. In response to exposure to the scene, the optically active rows of CCD bits store charge corresponding to the incident IR radiation. After exposure to the scene, but prior to exposure to the source of background radiation, the charge stored by the optically active bits is shifted to corresponding optically inactive CCD bits in an adjacent row. The array is then exposed to the source of the background radiation and the optically active CCD bits store charge corresponding to this background flux. Clocking means connected to the array of CCD bits then simultaneously clock out one CCD bit of background charge and one CCD bit of scene related data from an adjacent row of CCD bits. These two bits of data are coupled to a differential detector which is effective to remove the common background noise, thereby providing an output substantially free from background radiation. Since both the scene related data and background data are collected in the same detector element and are processed identically, material homogeneity requirements are greatly reduced.

Various clocking techniques can be utilized to provide a serial readout of the data from the CCD array. In one configuration, one frame of data, i.e., the data stored in the array of interlaced rows or optically active CCD bits and optically inactive bits, are shifted into a second CCD array wherein two adjacent rows of data can be simultaneously clocked out in series. This configuration is particularly advantageous inasmuch as relatively simple clocking means are sufficient, and while the data is being shifted from the second array, the first array can be exposed to store another frame of data.

Another clocking configuration is to clock the data from all of the rows of CCD bits horizontally to detector means during the interval between frames of data. In this configuration the data in the CCD array is read out column-by-column. This configuration requires more complex fabrication techniques, however.

Additional objects, advantages and features of the invention will be apparent upon reading the following detailed description of illustrative embodiments in conjunction with the drawings wherein.

Figure 1:
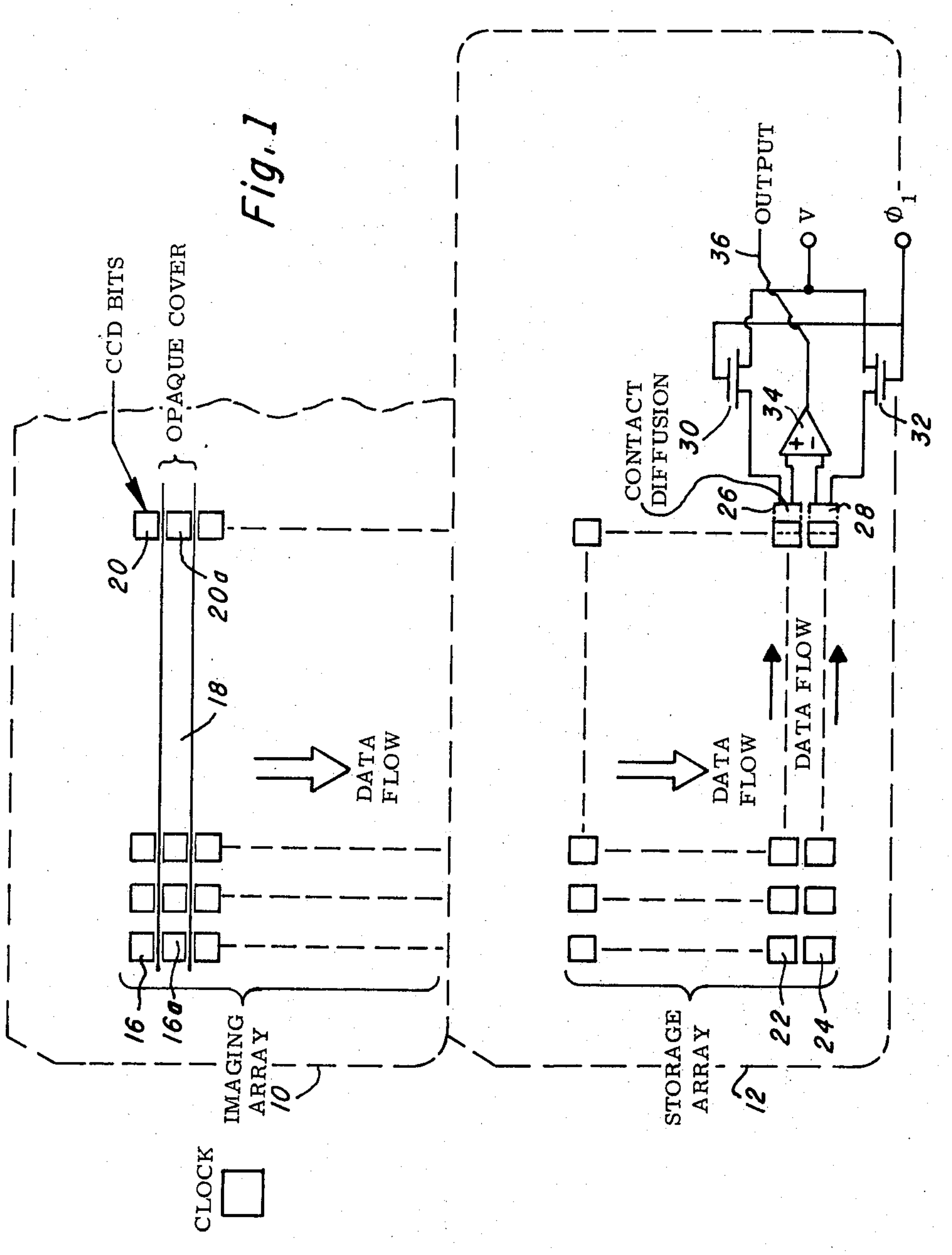
FIG. 1 is a plan view diagrammatically and schematically illustrating one embodiment of the present invention.

With reference now to FIG. 1, a plan view of an illustrative embodiment of the invention is shown partially in schematic and partially in diagrammatic form. In this embodiment an imaging array, enclosed by dashed line 10 of semiconductor charge-coupled device bits, is formed on a suitable semiconductor substrate (not shown) adjacent a storage array, enclosed by dashed line 12, of charge-coupled device bits. Imaging arrays of charge-coupled device bits are well known in the art and details of clocking arrangements and fabrication need not be described in detail herein. Reference, for example, the description in the article by Altman, "The New Concept for Memory and Imaging: Charge Coupling," *Electronics*, June 21, 1971, p. 50 et seq. A typical three phase CCD shift register is shown herein at FIG. 2 and will be described in greater detail below.

Figure 2:
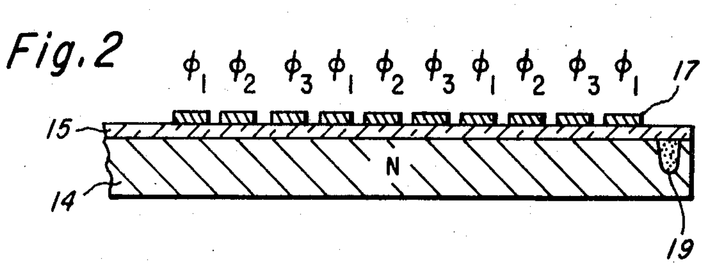
FIG. 2 is a cross-sectional view of a portion of a typical three phase CCD shift register.

As pointed out, CCD imagers for visual radiation are known in the art. The imaging array 10 differs from the known imagers in several important respects. First, CCD's are typically formed on silicon; the present array 10 is formed on a semiconductor substrate 14 (FIG. 2) that is sensitive to infrared radiation. Suitable substrates include *InSb*, and $Hg_xCd_{1-x}Te$, for example. Further, it will be noted that array 10 defines a number of rows 16 of CCD bits. Each column of bits in the array 10 is in essence a vertical CCD shift register. As those familiar with CCD operation will understand, data can be shifted from one bit in column to the adjacent bit by application clock pulses from a clock generator (not shown). Each CCD bit requires at least two clock lines, and typically a three phase clock system (as shown in FIG. 2) is used. Four phase and other polyphase systems can, of course, be utilized.

An important feature of the imaging array 10 is that alternate rows 16 are characterized as optically active, the ramaining interlaced rows (such as row 16*a*) are characterize as optically inactive. The CCD bits in the optically inactive rows 16*a* are covered by strips of material 18 which are opaque to infrared radiation. The strips 18 may, by way of illustration, comprise *Al*, *Cr*, *Mo*, or other metals. An important consideration is that all of the CCD bits in both of the arrays 10 and 12 be fabricated to be as nearly identical as possible.

In operation, a scene is viewed for IR radiation. The scene impinges on the surface of array 10 by suitable conventional imaging means (not shown) for a preselected exposure time. During this exposure the IR radiation generates hole-electron pairs in the substrate 14. Minority carriers are collected in potential wells associated with each bit in the optically active rows of CCD bits, the amount of charge being stored corresponding to the intensity of IR radiation striking that bit. (With reference to FIG. 2 each set of three electrodes, $\phi_1$, $\phi_2$ and $\phi_3$ defines one CCD bit, and the charge is collected, e.g., under the $\phi_2$ electrodes). No charge is collected under the optically inactive bits responsive to exposure of the array 10 to infrared radiation. The amount of charge stored by the optically active bits includes both IR radiation from the scene and rather substantial background radiation.

After a preselected exposure time to the scene, the data is shifted from each optically active CCD bit to a corresponding optically inactive bit in an adjacent row, as from bit 20 to bit 20*a* (FIG. 1). The array 10 is then exposed to a uniform source of background radiation for a time equal to the previous exposure of the array to the scene. This background radiation generates charge which is collected by the optically active bits such that after exposure to the background, one frame of scene related data plus background noise is stored by rows of optically inactive CCD bits while rows of optically active bits store data corresponding to the background radiation. A conventional chopper can be utilized to alternately expose the array 10. The frame data stored by the array 10 is shifted in total to the storage array 12. The image array 10 is then ready to receive a new frame of data.

The data in the storage array 12 is serially read out two rows at a time from shift registers shown generally at 22 and 24. The charge in each bit of shift register 22 is sequentially detected by diode 26, while the charge in corresponding bits of the shift register 24 is detected by diode 28. Diodes 26 and 28 are formed in the substrate 14 by conventional techniques. In a three phase system, diodes 26 and 28 are precharged to the same voltage V during clock $\phi_1$, for example, through transistors 30 and 32 and are discharged along with the signal charge during phase three. The difference of charge between that stored by a row of the array 10 which stored charge responsive to the scene (outputted from array 12 via shift register 24) and the charge stored in a row of the array 10 responsive to the background (outputted from array 12 via shift register 22) causes a difference in the voltage of the capacitances of diodes 28 and 26. The voltage difference is amplified by the differential amplifier 34 which produces an output at 36 free from background radiation components.

The amplifier 34 and transistors 30 and 32 are preferably formed on the same substrate as the CCD arrays 10 and 12, although this is not a requirement.

In FIG. 2, a typical three phase CCD is illustrated. The CCD includes a semiconductor substrate 14 over which is formed a thin insulating layer 15. A plurality of electrodes 17 are formed over the insulating layer 15. Multiphase clocks $\phi_1$, $\phi_2$ and $\phi_3$ are connected to corresponding electrodes. When properly biased the clocks form potential wells near the surface of the underlying semiconductor substrate 14. These potential wells are capable of storing charge. In the three phase system each set of three electrodes defines one CCD bit, and charge can be transferred in shift register fashion from one bit to the next by the multiphase clocks. The charge can be detected by a *p–n* junction 19.

Figure 3:
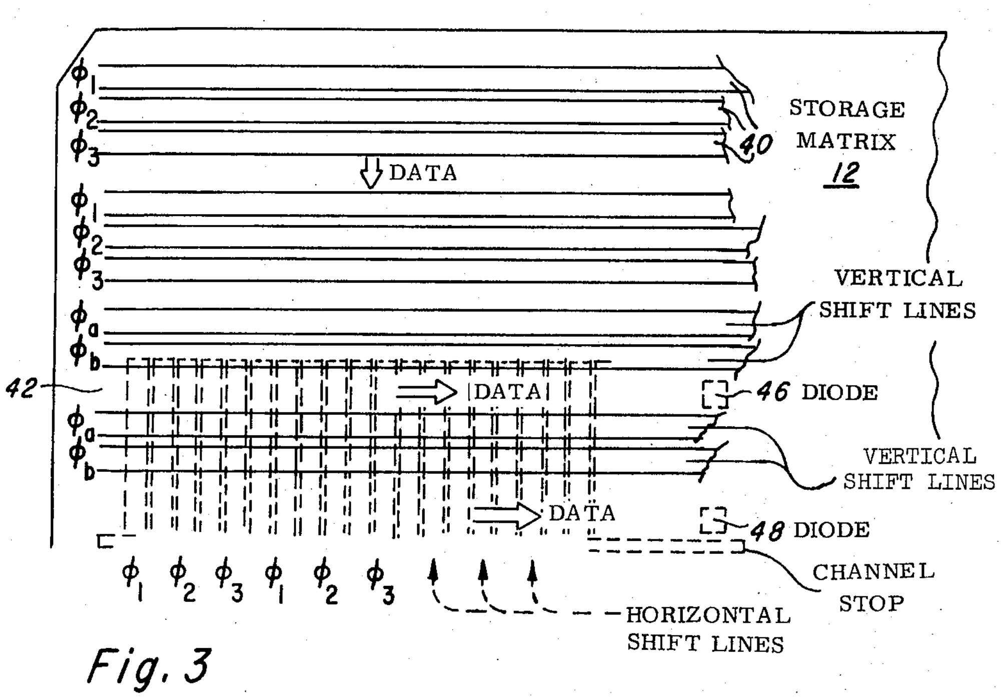
FIG. 3 is a plan view illustrating a suitable configuration for simultaneously providing a serial read-out of two adjacent rows of charge.

With reference to FIG. 3, a portion of the array 12 (FIG. 1) showing a suitable configuration for reading out two rows of data at a time is illustrated. Parallel electrodes shown generally at 40 receive multiphase clocks $\phi_1$, $\phi_2$ and $\phi_3$ and define a row of CCD bits. Charge is prevented from spreading laterally from one bit to the adjacent bit in row by doped channel stops (not shown) in the substrate. Such channel stops, for example, may comprise an *n+* shallow diffusion extendng from the surface of an n-type substrate. Use of channel stops to prevent lateral spread of charge in a CCD array is described is the literature and need not be treated in more detail herein.

Charge is transferred into bits of CCD horizontal shift registers 42 and 44 by vertical shift register transfer clock lines $\phi_a$ and $\phi_b$. In operation, clock lines $\phi_1$ and $\phi_3$ associated with the horizontal shift registers 42 and 44 are biased off to in effect act as channel stops for constraining data to the potential wells under $\phi_2$ electrodes. Charge is shifted into shift registers 42 and 44 by the $\phi_a$ and $\phi_b$ electrodes. When data is stored under the $\phi_b$ electrode, $\phi_2$ is turned on in effect simulating the required $\phi_c$ clock pulse, and data is transferred into bits of the registers 42 and 44; $\phi_a$ is off at this time acting as a channel stop. Once data is transferred into the shift registers 42 and 44 the data can be shifted out serially by activation of clock lines $\phi_1$, $\phi_2$ and $\phi_3$, and can be detected by diodes 46 and 48 as previously described.

The clock lines $\phi_a$, $\phi_b$ and the clock lines $\phi_1$, $\phi_2$ and $\phi_3$ for shift registers 42 and 44 can be formed using a double level anodized aluminum interconnect system. Details of such a system are included in copending U.S. Pat. application, Collins et al., Ser. No. 130,358, filed April 1, 1971 now U.S. Pat. No. 3,756,924 "Semiconductor Device and Method of Fabrication," assigned to the assignee of the present invention, and hereby incorporated herein by reference.

Figure 4:
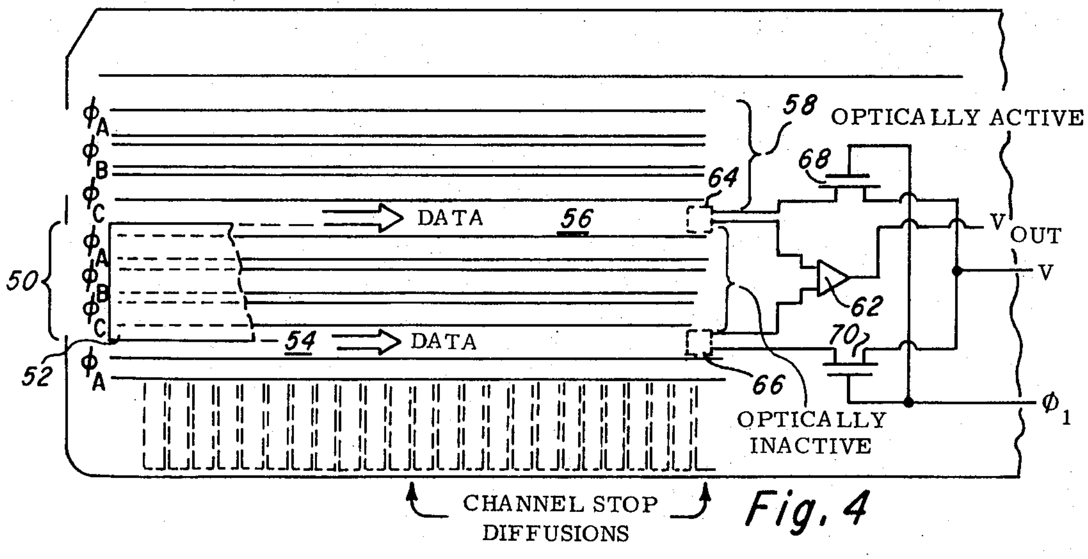
FIG. 4 is a plan view illustrating a suitable configuration for reading data from a CCD array column-by-column.

With respect to FIG. 4 an embodiment of the invention is disclosed wherein a single matrix of CCD bits is utilized and wherein data is shifted out horizontally, a column at a time. For clarity of illustration only two rows of bits are shown. As in the imaging array 10 (FIG. 1), alternate rows 50 of bits are covered with strips 52 of infrared opaque material so that these rows are optically inactive. Following exposure of the array first to a scene and then to background radiation, the scene related data is transferred from the optically inactive bits to region 54 between an optically inactive row and the following optically active row of bits, while background radiation noise is transferred from under the optically active row of bits 58 to the region 56 between row 58 and optically inactive row 50. Shifting data in the vertical direction is effected by multiphase clocks $\phi_A$, $\phi_B$ and $\phi_C$. Data is shifted horizontally along regions 56 and 54 by multiphase clocks $\phi_1$, $\phi_2$ and $\phi_3$ during the interval between frames of data. The charge in the respective bits is coupled to a differential amplifier 62 by diodes 64 and 66 as explained with respect to operation of FIG. 1. Transistors 68 and 70 are effective to precharge the diodes 64 and 66 to a reference voltage V. Again, the multilevel metallization configuration described in the aforementioned Collins et al. application can be utilized for defining the two sets of multiphase electrodes.

It can be seen that the various objects of the invention have advantageously been achieved. The configuration of the present invention wherein the optically active detector elements detect both scene related data and background radiation substantially removes the prior severe material homogeneity requirements of the CCD. By providing means for simultaneously coupling out corresponding bits of background radiation and scene related data it is possible to remove background noise components. While the invention has been described in detail with respect to illustrative embodiments, it will be apparent to those skilled in the art that various modifications can be made without departing from the spirit or scope of the invention.

What is claimed is:

1. An infrared imager system comprising:

a. a semiconductor substrate;

b. an array of charge coupled device bits formed on said substrate and having alternate rows of optically active bits and optically inactive bits;

c. means for alternately exposing said array first to a scene and then to a source of infrared background radiation;

d. clock means for shifting data stored by rows of said optically active bits during exposure of said array to a scene to adjacent rows of optically inactive bits prior to exposing said array to said source of background radiation; and e. detector means coupled to said array for simultaneously coupling data sequentially from a row of charge-coupled device bits corresponding to data stored in a row of said optically active bits and an adjacent row of charge-coupled device bits corresponding to data stored in a row of optically inactive bits to a differential amplifier for providing an output corresponding to said scene and substantially free from background radiation.

2. An infrared imager as set forth in claim 1 wherein said detector means comprise first and second diodes in said substrate respectively disposed for receiving charge transferred from said optically active row and optically row of charge-coupled device bits, each diode having a capacitance which is varied responsive to charge transferred thereto; and means for ohmically connecting said capacitors to first and second inputs of a differential amplifier.

3. An infrared detector as set forth in claim 2 wherein said detector means are further characterized by first and second insulated gate field effect transistors formed in said substrate for selectively applying a voltage to said first and second diode to establish a reference voltage potential prior to transfer of each bit of charge thereto.

4. An infrared imager system comprising in combination:

a. a semiconductor substrate;

b. a first array of charge-coupled device bits formed in a first region of said substrate, alternate rows of said bits covered by a strip of material substantially opaque to infrared radiation;

c. means for exposing said first array to a scene for a first exposure time, infrared radiation from said scene effective to generate charge carriers in said substrate which are stored by the alternate rows of charge-coupled device bits free from said opaque strips;

d. clock means for shifting said stored charge carriers to adjacent opaque covered rows of charge transfer device bits;

e. means for exposing said first array to a source of background radiation for a second exposure time equal to said first exposure time;

f. a second array of charge-coupled device bits formed in a second region of said substrate adjacent said first region;

g. means for shifting data stored in said first array responsive to said first and second exposures to said second array of charge-coupled device bits; and h. detector means for simultaneously coupling data from successive bits of two adjacent rows of said second array of charge-coupled device bits to a differential amplifier.

5. An infrared imager system comprising in combination:

a. a semiconductor substrate defining first and second adjacent portions;

b. a first row and column array of charge-coupled device bits in said first portion of said substrate, alternate rows of bits covered by strips substantially opaque to infrared radiation, said first array including means for shifting data from one row of bits to an adjacent row of bits;

c. means for alternately exposing said first array to a scene and then to background radiation, whereby during exposure to said scene alternate rows of charge-coupled device bits in said first array store data corresponding to said scene and background radiation, this data being shifted to storage bits underlying said opaque strips prior to exposure of said first array to just the background radiation, such that subsequent to exposure to said background radiation said first array has stored at alternate rows of bits data corresponding to one frame of the scene in addition to background radiation, the remaining interlaced rows of bits containing data corresponding only to background radiation;

d. a second row and column array of charge-coupled device bits in said second portion of said substrate for receiving data stored by said first array and for providing a simultaneous serial readout of data in two adjacent rows, one row containing data corresponding only to background radiation and the other row containing data corresponding to the sum of the background radiation and scene related data;

e. first and second detector means in said second portion of said substrate for simultaneously detecting successive bits of data in said two adjacent rows; and f. differential amplifier means connected to said first and second detector means for providing a line by line readout of scene related data substantially free from background radiation.

6. An infrared imager system characterized by an output substantially free from infrared background related signals comprising in combination:

a. a semiconductor substrate of one conductivity type, said substrate sensitive to incident radiation in the infrared region whereby responsive to such radiation, electron-hole pairs are generated in said substrate, said substrate defining first and second adjacent portions;

b. a thin insulating layer overlying one surface of said substrate;

c. a plurality of spaced conductive electrodes on said insulating layer overlying said first and second adjacent portions of said substrate defining a plurality of rows of semiconductor charge-coupled device bits, whereby responsive to selected bias voltage applied to aid conductors, inversion regions capable of storing charge carriers are formed in said substrate under corresponding conductors;

d. a plurality of strips of material substantially opaque to infrared radiation overlying alternate rows of charge-coupled device bits over said first portion of said substrate;

e. imaging means for alternately exposing charge-coupled device bits in said first portion of said substrate to a scene and to a source of background radiation;

f. first clock means for shifting data stored by alternate rows of charge-coupled device bits into adjacent rows of opaque covered charge-coupled device bits in the interval between exposure to said scene and said background radiation;

g. second clock means for shifting the data stored by each row of charge-coupled device bits in said first portion of said substrate to charge-coupled device storage bits in said second portion of said substrate prior to again exposing said first portion of said substrate to said scene;

h. means for simultaneously shifting out in series two adjacent rows of scene related data and background data respectively from said rows of charge-coupled device bits in said second portion of said substrate;

i. capacitance means in said second portion of said substrate for detecting the level of charge in successive bits of said two rows; and j. differential voltage detector means coupled to said capacitance means for providing an output signal corresponding to said scene and substantially free from background radiation.

7. An infrared imager comprising:

a. a semiconductor substrate;

b. an insulating layer over one surface of said substrate;

c. a first plurality of substantially parallel spaced electrodes over said insulating layer thereby defining a plurality of horizontal charge-coupled device shift registers;

d. a second plurality of substantially parallel electrodes overlying said first plurality of electrodes and insulated therefrom, said second plurality of electrodes disposed substantially orthogonal to said first plurality of electrodes, and defining a plurality of vertical charge-coupled device shift registers, alternate rows of charge-coupled device bits being covered with strips of material substantially opaque to infrared radiation thereby defining rows of optically inactive bits, the remaining rows of bits being characterized as optically active bits, adjacent optically active and optically inactive rows of bits being spaced apart and selectively coupled by said first plurality of electrodes;

e. variable clock means connected to said first and second plurality of electrodes for selectively transferring data in shift register fashion;

f. means for alternately exposing said substrate to a scene and to a source of background radiation, charge carriers generated during exposure of said scene being stored by said optically active rows of bits and prior to exposure to said source of background radiation, transferred by said variable clock to said rows of optically inactive bits; and g. detector means coupled to the outputs of said horizontal shift registers for simultaneously coupling data from an optically active row of bits and an adjacent row of optically inactive bits to a differential amplifier for providing a column by column readout of scene related data substantially free from background radiation.

* * * * *